US012506664B2

United States Patent
Km

(10) Patent No.: US 12,506,664 B2
(45) Date of Patent: Dec. 23, 2025

(54) TIME SENSITIVE NETWORK SIMULATOR

(71) Applicant: ABB AG, Mannheim (DE)

(72) Inventor: Pradeepkumar Km, Bangalore (IN)

(73) Assignee: ABB AG, Mannheim (DE)

( * ) Notice: Subject to any disclaimer, the term of this patent is extended or adjusted under 35 U.S.C. 154(b) by 0 days.

(21) Appl. No.: 18/534,975

(22) Filed: Dec. 11, 2023

(65) Prior Publication Data

US 2024/0106719 A1 Mar. 28, 2024

Related U.S. Application Data

(63) Continuation of application No. PCT/EP2021/065788, filed on Jun. 11, 2021.

(51) Int. Cl.
*H04L 41/14* (2022.01)
*G05B 19/05* (2006.01)

(52) U.S. Cl.
CPC .......... *H04L 41/145* (2013.01); *G05B 19/054* (2013.01)

(58) Field of Classification Search
None
See application file for complete search history.

(56) References Cited

U.S. PATENT DOCUMENTS

2017/0134254 A1* 5/2017 Mueller ................ H04L 12/462
2020/0310394 A1* 10/2020 Wouhaybi ........... H04L 67/1051

FOREIGN PATENT DOCUMENTS

| CN | 108737003 A | 11/2018 |
| CN | 111164952 A | 5/2020 |
| WO | WO 2020/081060 A1 | 4/2020 |
| WO | WO 2020/136487 A2 | 7/2020 |
| WO | WO 2021/079599 A1 | 4/2021 |

OTHER PUBLICATIONS

Bergstrom, Network Configuration in Simulated Time Sensitive Networking (TSN) Applications, Jan. 2020 (Year: 2020).*
Li, Practical Implementation of an OPC UA TSN communication architecture for a manufacturing System, Nov. 2020 (Year: 2020).*
Mubeen et al., "Delay Mitigation in Offloaded Cloud Controllers in Industrial IoT," *IEEE Access*, 5: 4418-4430 (Apr. 24, 2017).
Jiang et al., "A Time-Sensitive Networking (TSN) Simulation Model Based on OMNET++," *2018 IEEE International Conference on Mechatronics and Automation (ICMA)*, IEEE, 643-648 (Aug. 5, 2018).

(Continued)

*Primary Examiner* — Fadi Haj Said
(74) *Attorney, Agent, or Firm* — Leydig, Voit & Mayer, Ltd.

(57) ABSTRACT

A time sensitive network (TSN) simulator for connecting a first device of a distributed control system (DCS) for an industrial plant to at least one second device of the DCS that is configured as a TSN client, comprising a first interface that is connectable to the first device; a second interface that is connectable to the second device; and a simulation unit that is configured to forward network traffic between the first interface and the second interface and to modify and/or delay network traffic during this forwarding, thereby simulating the behavior of a real, non-perfect TSN that provides communication between the first device and the second device.

10 Claims, 4 Drawing Sheets

(56) References Cited

OTHER PUBLICATIONS

Zhou et al., "An Efficient Configuration Scheme of OPC UA TSN in Industrial Internet," *2019 Chinese Automation Congress (CAC), IEEE*, 1548-1551 (Nov. 22, 2019).

European Patent Office, International Preliminary Report on Patentability in International Patent Application No. PCT/EP2021/065788, 6 pp. (May 15, 2023).

European Patent Office, International Search Report in International Patent Application No. PCT/EP2021/065788, 5 pp. (Feb. 25, 2022).

European Patent Office, Written Opinion in International Patent Application No. PCT/EP2021/065788, 7 pp. (Feb. 25, 2022).

* cited by examiner

TIME SENSITIVE NETWORK SIMULATOR

CROSS-REFERENCE TO RELATED APPLICATIONS

The instant application claims priority to International Patent Application No. PCT/EP2021/065788, filed Jun. 11, 2021, which is incorporated herein in its entirety by reference.

FIELD OF THE DISCLOSURE

The present disclosure relates to time sensitive networks (TSN) for use as a communication medium in distributed control systems (DCS) in industrial plants.

BACKGROUND OF THE INVENTION

Distributed control systems (DCS) for an industrial plant comprises a plurality of controllers, sensors and actuators. Sensors may, for example, deliver measurement values from within an industrial process being executed on the plant. A controller may then, for example, communicate with actuators that physically act upon the process with the goal of keeping the measurement value (such as a temperature or a pressure) at a desired set-point value.

Communication within the DCS requires a fast and reliable delivery of data streams. Dedicated field bus networks are designed to provide the required low latency and reliability, but it is intended to replace multiple proprietary field bus systems with a standardized high-performance network. For this purpose, time sensitive networks, TSN, that build upon traditional Ethernet networks are well-known in the art. WO 2020/136 487 A2 discloses a controller for process plants that is able to communicate in a network with a mixture of TSN devices and non-TSN devices.

Configuration of a TSN as a whole may be quite complex and time-consuming depending on the number of participants.

US 2020/310 394 A1 discloses systems and methods for implementing a software defined industrial system. An orchestrated system of distributed nodes may run an application, including modules implemented on the distributed nodes. In response to a node failing, a module may be redeployed to a replacement node.

Z. Zhou et al., "An Efficient Configuration Scheme of OPC UA TSN in Industrial Internet", 2019 Chinese Automation Congress, IEEE, 1548-1551, doi: 10.1109/CAC48633.2019.8996369 discloses a configuration scheme of OPC UA time-sensitive networks, TSN, including a verification that this configuration scheme can satisfy the bounded delay requests of periodic time-sensitive data flows.

J. Jiang et al., "A Time-sensitive Networking (TSN) Simulation Model Based on OMNET++", Proceedings of the 2018 IEEE International Conference on Mechatronics and Automation, 643-648, ISBN: 978-1-5386-6074-4, doi: 10.1109/ICMA.2018.8484302 discloses a TSN simulation model based on OMNET++. A TSN-enabled switch that schedules traffic using gate control lists (GCLs) is modelled. Simulation verifies that the model guarantees deterministic end-to end latency.

WO 2021/079 599 A1 discloses a manner of scheduling traffic in a TSN that is to support a distributed control system.

BRIEF SUMMARY OF THE INVENTION

The present disclosure describes a tool that facilitates the deployment and the troubleshooting of TSN networks. In one embodiment, the present disclosure describes a TSN simulator, a programmable logic controller, PLC, a method for troubleshooting an abnormal state in a DCS, and a method for deploying a DCS.

In one embodiment, a simulator for a time sensitive network, TSN, is described. This simulator is configured for connecting a first device of a distributed control system, DCS, to at least one second device of the DCS. The DCS is to perform a control task in an industrial plant. The at least one second device is configured as a TSN client, so that it is connectable to a TSN. The first device may be configured as a TSN client as well, but it may also be configured to any other communication standard, such as one of the known proprietary field bus standards.

The simulator comprises a first interface that is connectable to the first device and a second interface that is connectable to the second device, and/or to a TSN to which the second device is attached. The simulator further comprises a simulation unit that is configured to forward network traffic between the first interface and the second interface. The simulation unit is further configured to modify and/or delay network traffic during this forwarding. In this manner, the behavior of a real, non-perfect TSN that provides communication between the first device and the second device is simulated.

It was discovered that when a DCS is deployed, it is frequently presumed and taken for granted that the TSN network is performing as per its specification. The TSN is presumed to be an "ideal" TSN. In a real deployment, depending on the complexity of the TSN and its number of participants, it may be quite difficult to guarantee that the TSN performs ideally. In particular, deployments of new DCS, or add-ons or upgrades to existing DCS, frequently need to be made using an already existing TSN to which a plurality of devices is already connected. Usually, the complete deployment is worked out off-premises well in advance by the supplier of the DCS, the add-on, or the upgrade. It is intended to come onto the customer premises with a complete "recipe" and to put this into practice. However, if any assumption about the on-premises TSN turns out not to be valid at this time, then the deployment may behave unexpectedly, or may not work as planned at all. Ad-hoc solutions then need to be crafted in a hurry, which may cause further problems later.

With the TSN simulator, it can be determined in advance how the behavior of the DCS changes if the TSN is not performing ideally. The configuration of the DCS may then be "hardened" in the sense that it depends on an ideal functioning of the TSN to a lesser degree and tolerates some deviation from this ideal state.

Also, if the simulation with the TSN simulator reveals that a certain deviation of the TSN from the ideal state will cause a certain behavior of the DCS, and this behavior occurs at the time of the real deployment in the industrial plant, the problem in the TSN of the industrial plant may be pinpointed. After the problem has been remedied, the deployment of the DCS may continue as planned.

Thus, the simulation unit that causes the TSN communication to happen in a "realistic" manner, rather than in an "idealized" manner, is the main difference between a TSN simulator and a mere adaptor or software driver that connects a non-TSN-aware first device to a TSN.

BRIEF DESCRIPTION OF THE SEVERAL VIEWS OF THE DRAWING(S)

DETAILED DESCRIPTION OF THE INVENTION

Figure 1:
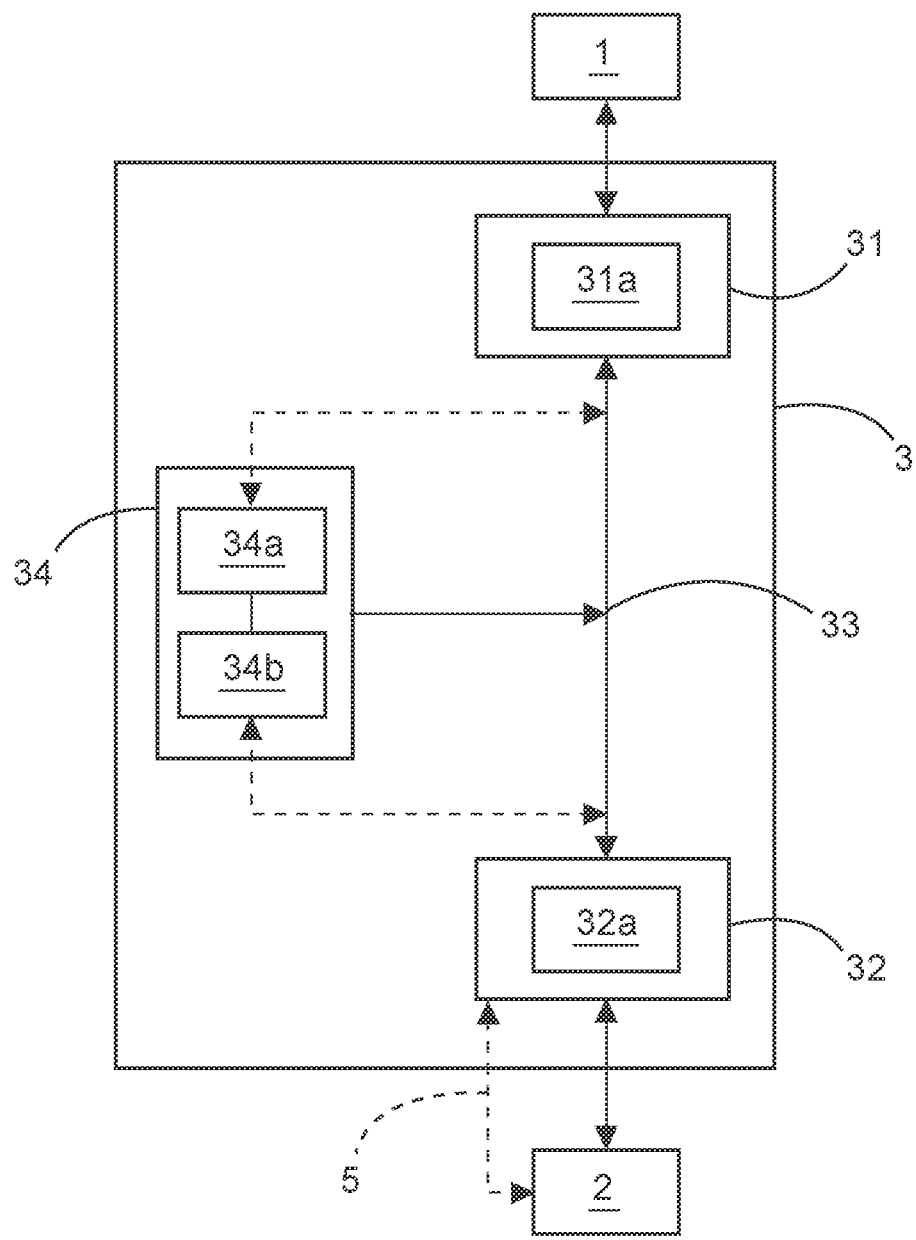
FIG. 1 is a block diagram of a TSN simulator in accordance with the disclosure.
Figure 2:
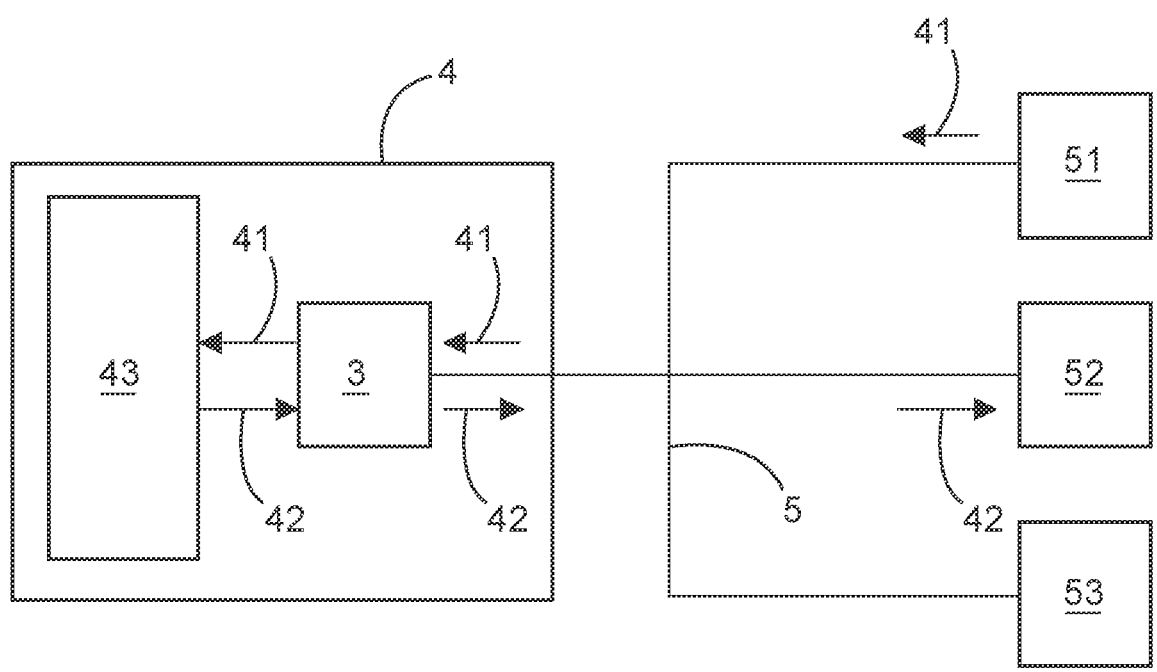
FIG. 2 is a block diagram of a PLC having a TSN simulator in accordance with the disclosure.
Figure 3:
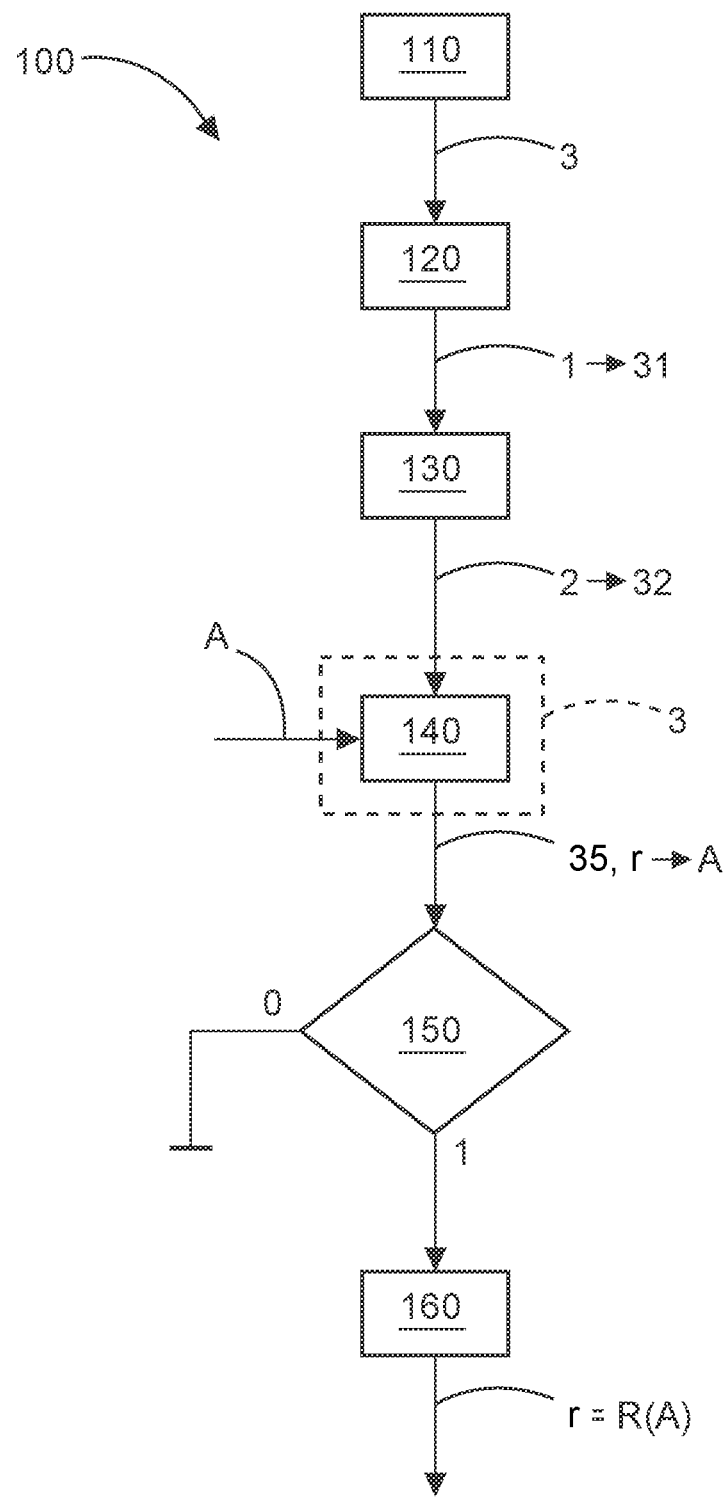
FIG. 3 is a flowchart for a method for troubleshooting an abnormal operational state A in accordance with the disclosure.
Figure 4:
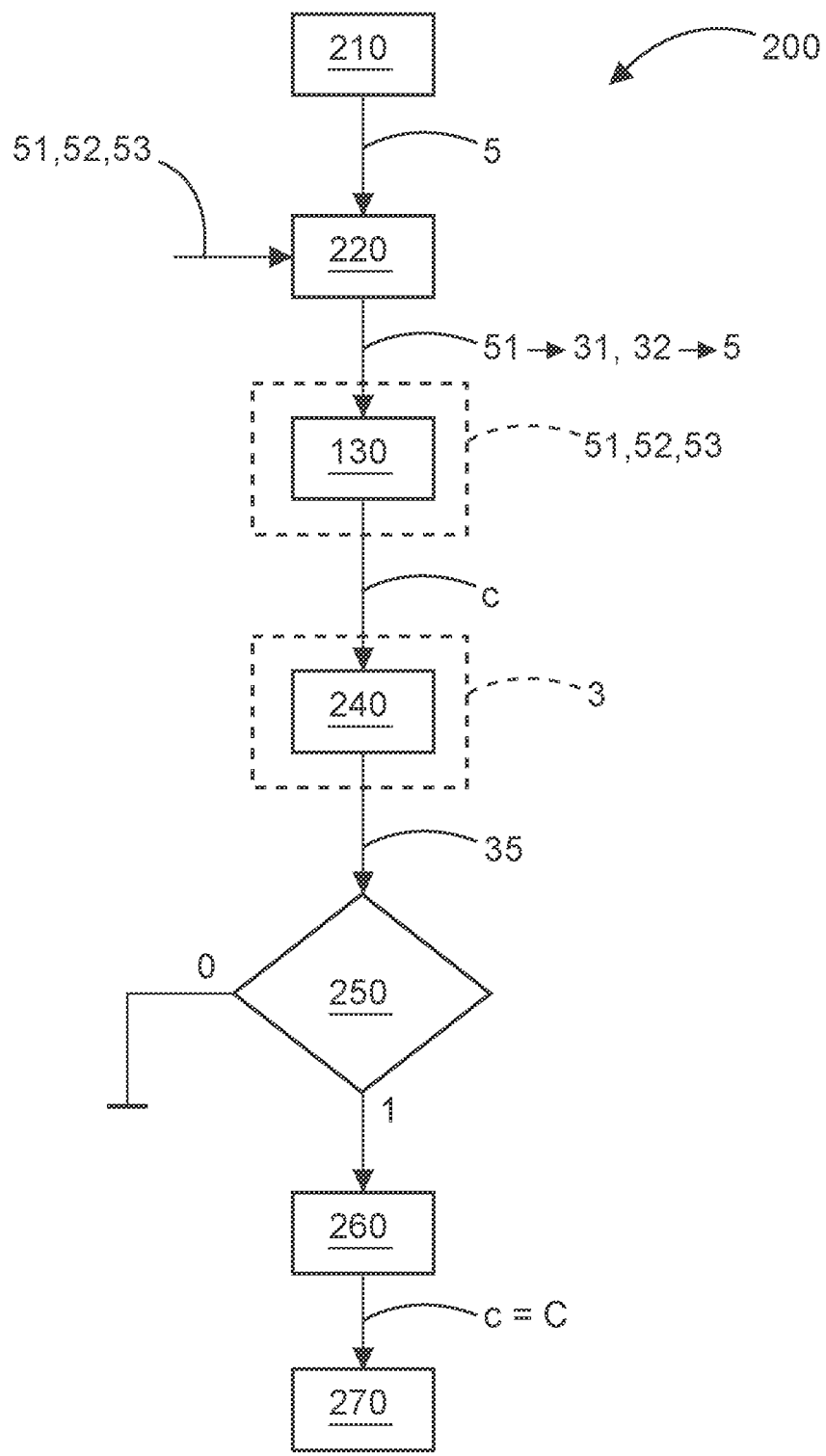
FIG. 4 is a flowchart for a method of deploying a DCS in accordance with the disclosure.

FIG. 1 shows an exemplary embodiment of the TSN simulator 3 in accordance with the disclosure. FIG. 2 illustrates an exemplary embodiment of a PLC 4 with the TSN simulator 3. FIG. 3 shows an exemplary embodiment of a method 100 for troubleshooting an abnormal operational state A, and FIG. 4 shows an exemplary embodiment of a method 200 for deploying a DCS.

In reference to these figures, FIG. 1 is a schematic drawing of an exemplary embodiment of the TSN simulator 3. The TSN simulator 3 is configured for connecting a first device 1 of a DCS to a second device 2 of the DCS that is configured as a TSN client.

The TSN simulator 3 comprises a first interface 31 that is connectable to the first device 1. The second interface 32 of the TSN simulator 3 is connectable to the second device 2, and/or to a TSN 5 to which the second device 2 is attached. Network traffic 33 between the first device 1 and the second device 2 passes between the first interface 31 and the second interface 32 in both directions. The first interface 31 and the second interface 32 comprise distinct system clocks 31a, 32a that are configured to run offset against each other in time, and/or to run at different speeds.

On the path between the first interface 31 and the second interface 32, the network traffic 33 may be altered and/or delayed by the simulation unit 34. In the example shown in FIG. 1, this is effected by mimicking, inside the simulation unit 34, a whole TSN comprising multiple TSN switches and/or bridges 34a, 34b. Messages from the network traffic 33 are fed into a first chosen port of a switch and/or bridge 34a, 34b, and the result of the processing by the mimicked TSN is taken from a second port of a switch and/or bridge 34a, 34b.

FIG. 2 is a schematic drawing of an exemplary embodiment of a PLC 4 that is connected to a TSN 5 via an integrated TSN simulator 3. In the example shown in FIG. 2, the TSN 5 comprises three devices 51, 52, 53. Control logic 43 of the PLC 4 obtains input data 41 from device 51, processes these input data 41 into an actuation signal 42 and sends this actuation signal 42 to the device 52 via the TSN simulator 3 and the TSN 5.

FIG. 3 is a schematic flow chart of an exemplary embodiment of the method 100 for troubleshooting an abnormal operational state A in the cooperation between a first device 1 and a second device 2 in a distributed control system, DCS, of an industrial plant.

In step 110, a TSN simulator 3 is provided. In step 120, the first device 1, or a proxy for this first device 1, is connected to the first interface 31 of the TSN simulator 3. In step 130, the second device, or a proxy for this second device, is connected to the second interface 32 of the TSN simulator 3. In step 140, based on the abnormal operational state A, a candidate configuration 35 as to when and how the TSN simulator 3 is to modify and/or delay network traffic 33, as detailed further in FIG. 1, is implemented on the TSN simulator 3. The candidate configuration 35 is indicative of a candidate root cause r of the abnormal operational state A.

In step 150, it is checked whether the candidate configuration 35 causes the abnormal operational state A. In other words, it is checked whether the abnormal operational state A can be reproduced by the candidate configuration 35. If this is the case (truth value 1), in step 160, it is determined that the candidate root cause r is a likely root cause R(A) for the abnormal operational state A.

FIG. 4 is a schematic flow chart of the method 200 for deploying a DCS with a plurality of devices 51, 52, 53 that are to be connected to a given TSN 5 in an industrial plant. In step 210, the given TSN, or a proxy for this TSN 5, is provided. In step 220, the devices 51, 52, 53 are connected to the TSN 5 or to the proxy for this TSN 5. At least one device 51 is connected to the first interface 31 of the TSN simulator 3 described above, and the second interface 32 of this TSN simulator 3 is connected to the TSN 5 or to the proxy. In step 230, a candidate configuration c with respect to the intended functionality of the DCS is implemented on the devices 51, 52, 53. In step 240, a plurality of test configurations 36 as to when and how the TSN simulator 3 is to modify and/or delay network traffic 33 is implemented on the TSN simulator 3. Each test configuration 36 corresponds to an abnormal operating state of the TSN 5 that is to be expected in the TSN 5 of the industrial plant.

In step 250, it is determined, for each test configuration 36, whether the arrangement of the plurality of devices performs the intended functionality of the DCS despite the abnormal operating state caused by the test configuration 36. In other words, it is tested whether the functionality of the DCS as it is according to the candidate configuration c is resistant against a disturbance of the TSN according to the test configuration 36. If this is the case for all test configurations 36 (truth value 1), it is determined, in step 260, that the candidate configuration c is a configuration C that is fit for deployment in the industrial plant. In step 270, this fit configuration C of the DCS is deployed in the TSN 5.

In the embodiments in accordance with the disclosure, the first interface, the second interface and the simulation unit may be embodied in hardware, software, firmware or any combination thereof. For example, they may be embodied as application-specific integrated circuits, ASICs, or in programmed circuitry of field-programmable gate arrays, FPGAs. But they may also be realized in software running on general purpose computer hardware. Hardware solutions, such as ASICs or FPGAs, may provide a higher throughput and a better energy efficiency at the price that any changes or updates require more effort.

There are a number of advantageous options as to how the simulation unit may modify and/or delay network traffic.

In one example, at least one original message received on the first or second interface may be held back for a predetermined and/or randomized time, and this original message may then be forwarded to the second, respectively the first, interface. This may simulate a deviation from the ideal TSN behavior that the delivery of messages within a predetermined time is guaranteed. In this manner, critical dependencies of the DCS on the timing of the message delivery may be revealed. For example, there may be "race conditions" of the kind that an control action is attempted at a time where a required prerequisite is not yet met because a message with which the provision of this prerequisite was to be triggered did not come through in time. For example, a heater of a reaction vessel may be switched on even though the inlet valve for the to-be-heated substance has not opened yet and the vessel is empty, potentially causing overheating and damage to the vessel and/or heater.

In particular, the simulation unit may be configured to hold back at least one message in deliberate contradiction to the TSN priority class, and/or of the TSN preemption split, that applies to this original message, and/or to another original message, so as to mimic a faulty implementation of the TSN priority and/or preemption handling.

In another example, a stream of original messages received on the first or second interface may be augmented with further messages, and a mixture of the original messages and the further messages may be delivered to the second, respectively the first, interface. In this manner, the presence of further participants in the TSN may be simulated. For example, while only the presence of certain participants in the TSN may be planned for, there may be unexpected further participants because the documentation on the devices in the industrial plant is not up to date, the TSN is misconfigured, or a device has been plugged into a wrong switch port or even into a wrong switch. This may cause problems if the DCS assumes that the TSN carries only messages exchanged among a certain set of participants.

In another example, a subset of the messages from a stream of original messages received on the first or second interface may be suppressed. A stream of the original messages minus the suppressed messages may be delivered to the second, respectively the first, interface. In this manner, a loss of messages during transmission through the TSN may be simulated. For example, the queue of a TSN switch for each TSN priority class only has a finite size. If messages of a lower priority class are preempted and have to wait, and the size of the queue is exhausted by an inrush of too many such messages, then either the oldest message in the queue may have to be evicted from the queue, or the newest message may have to be refused entry to the queue.

In another example, individual messages in a stream of original messages received on the first interface or second interface may be modified. A stream of messages in which modified messages take the places of original messages may then be delivered to the second interface, respectively to the first interface. I.e., if a particular message has not been modified, the original version is sent, but if a modified version exists, this modified version, rather than the original version, is sent. In this manner, unwanted and unexpected changes to the content of messages may be simulated.

For example, at least one individual message may be modified by garbling the message with a noise sample, so as to mimic a noisy physical transmission. In another example, the message may be rewritten and/or recast such that it violates TSN or any other communication standard in use on the path between the first device and the second device. This mimics a faulty implementation of the respective communication standard.

The simulation unit may also be more complex. For example, the simulation unit may comprise representations of at least two TSN bridges and/or switches and be configured to: feed at least one message from the first interface to a chosen port of one of the TSN bridges and/or switches, process the message by the TSN bridges and/or switches, and feed the outcome from another chosen port of one of the TSN bridges and/or switches to the second interface. The message will then be modified, delayed, or suppressed according to the behavior of the TSN bridges and/or switches comprised in the simulation unit.

In another advantageous embodiment, the first interface and the second interface may comprise distinct system clocks that are configured to run offset against each other in time, and/or to run at different speeds. In this manner, clock skew may be simulated. This is a major source of error in TSN networks and may cause hard-to-diagnose problems in a DCS. In particular, transmission of messages may be delayed, or messages may collide and get lost as a result of a poor synchronization within the TSN.

The modifying and/or delaying of messages may be performed at random, so as to simulate spurious errors. But the modifying and/or delaying may also be performed in response to the stream of original messages received on the first, respectively second, interface meeting at least one predetermined rule. In this manner, systematic errors, such as a software bug in one participant of the TSN, may be simulated.

For example, at least one rule may cause at least one message to be modified and/or delayed in response to: the message originating from, or being destined to, a particular network address; the message originating from, or being destined to, a device of a particular type; and/or the message originating from, or being destined to, a device from a particular vendor; and/or the payload of the message fulfilling a predetermined condition.

In a further advantageous embodiment, at least the second interface is configured to communicate with the second device according to the Open Platform Communication Unified Access, OPC UA, standard. In particular, if the first interface is configured to communicate with the first device according to a different standard, the TSN simulator may be used to exploit novel features of OPC UA on behalf of the first device even though the first device is not aware of such features. For example, the TSN simulator may provide an OPC server that is accessible by OPC client devices in the TSN. This OPC server may expose symbols, tags or any other handles with which the functionality of the first device may be accessed to the OPC client devices in the TSN.

The invention also provides a programmable logic controller, PLC. This PLC is configured to TSN, of an industrial plant, process the input data into an actuation signal using control logic, and send this actuation signal to at least one device connected to the TSN network.

For example, the PLC may be configured to communicate with real time devices such as: input and output modules; drives or other actuators; human-machine interfaces, HMI, such as supervisory control and data acquisition, SCADA, software, and/or hardware panels; robots or vehicles; or one or more other third-party PLCs.

As discussed above, on top of enabling the PLC to communicate with a TSN network, and optionally also to use OPC UA capabilities, in the first place, the TSN simulator allows to study the behavior of the PLC and the DCS to which the PLC belongs in situations where the TSN is performing in a less-than-ideal manner. In particular, a wide variety of errors and incompatibilities may be simulated.

Like the TSN simulator, the PLC may be embodied in hardware, software, firmware, or any combination thereof. In a particularly advantageous embodiment, the PLC and the TSN simulator are realized in one common software package. This is particularly economic in terms of hardware because this common software package may utilize the capacity of a typical general-purpose industrial PC well. I.e., this hardware is not under-utilized, as it might be the case with separate PCs for the PLC on the one hand and the TSN simulator on the other hand.

The term "software package" does not imply that the PLC and the TSN simulator need to be amalgamated in one single monolithic piece of software. Rather, they may, for example, be distinct applications that run on one and the same physical hardware and communicate with each other by any suitable means for inter-process communication. For example, the distinct applications may run as daemons or other services, and communicate with each other by means of sockets, named pipes or TCP/IP communication via the local loopback interface.

A common software package is also advantageous during engineering of the plant. For example, this software package may be run concurrently with an engineering tool for the DCS on one single PC, or on another PC within the engineer's local network. In this manner, if the simulation of less-than-ideal operating states of the TSN reveals that the engineering of the DCS should be amended, this amendment may be developed and tested with a short turn-around time.

Also, because a PC has more processing power than typical dedicated PLC hardware, the PC may remain in the DCS as a permanent solution. In particular, the PC may complete the reading of input data from other devices, the performing of the control calculations according to the control scheme of the plant, and the writing back of output data to other devices within a single TSN communication cycle ("in-cycle control").

As discussed before, one advantage of the TSN simulator is that it can mimic abnormal operating states of the TSN. This may be exploited to track down problems in the real TSN.

The invention therefore also provides a method for troubleshooting an abnormal operational state in the cooperation between a first device and a second device in a distributed control system, DCS, of an industrial plant. The first device and the second device communicate via a time sensitive network, TSN, of the industrial plant.

The method starts with providing the TSN simulator described above. The first device, or a proxy that is configured to behave identically to the first device, is connected to the first interface of the TSN simulator. The second device, or a proxy that is configured to behave identically to the second device, is connected to the second interface of the TSN simulator.

A proxy for the first and/or second device may, for example, be another hardware instance of the respective device that is of the same make, model, and version. Except in a case where the hardware of the actual first and/or second device is faulty, such a hardware proxy should exhibit exactly the same behavior as the original first and/or second device, including the timing with which input data are processed into output data and the output data are sent from the respective device.

In another example, a proxy for the first and/or second device may be implemented in software. This is cheaper than procuring another physical hardware instance as a proxy, especially if the physical device whose behavior the proxy is to mimic is of an older date and has already been discontinued. On the other hand, it is more difficult to exactly mimic the behavior of the physical device, including the timings of any responses, in software. For example, a PC on which an emulation or other proxy for a PLC operates may have faster hardware than the physical PLC, and may thus perform control computations more quickly than the physical PLC. With the software proxy in the control loop, it may then not be possible to reproduce problems that are caused by the physical PLC not being able to perform its control computations quickly enough.

On the TSN simulator, a candidate configuration is implemented. This candidate configuration determines when and how the TSN simulator is to modify and/or delay network traffic. The candidate configuration indicative of a candidate root cause of the abnormal operational state.

In response to this candidate configuration causing the given to-be-troubleshooted abnormal operational state, it is determined that the candidate root cause is a likely root cause for the abnormal operational state.

For example, the given to-be-troubleshooted abnormal operational state in a DCS may comprise a situation where, at the time at which a certain process step should be initiated in the plant, prerequisites are not met because certain actions commanded by the PLC have not been performed. It is suspected that the control commands from the PLC got lost during transmission to the respective actuators in the plant, but it is unclear why this happened. One possible explanation is that the queue of a TSN switch for a certain TSN priority class was full at some time, and this caused the control commands to be lost. A candidate configuration of the TSN simulator may be set up to provoke exactly this overflowing of the queue in one of the TSN switches or bridges simulated within the TSN simulator. This may cause messages with control commands to be suppressed on their way through the simulation unit. If this behavior in turn causes the to-be-troubleshooted abnormal operational state to appear, then the overflowing of the queue may be pinpointed as a likely root cause of the abnormal operational state.

This is in some way analogous to aircraft or spacecraft accident investigations where it is determined with lab and simulator tests whether a suspected root cause really has the potential to escalate into the given accident. For example, after the loss of the Columbia space shuttle, the hypothesis of an impact of insulation foam being the root cause was only accepted after a lab test revealed that this soft material could indeed crash through the hard material of the heat shield.

As discussed before, the TSN simulator may also facilitate the deployment of a DCS because it may be used to make the planning more accurate. In particular, because the planning starts from a situation that is more in agreement with the actual situation in the plant where the DCS is to be deployed, less unexpected situations happen during the actual deployment. Also, it may be made a goal in the planning of the DCS to deliberately "harden" it against deviations of the TSN operation from its ideal operation.

The invention therefore also provides a method for deploying a distributed control system, DCS, with a plurality of devices that are to be connected to a given time sensitive network, TSN, in an industrial plant.

The method starts with providing the TSN, or a proxy that is configured to behave identically to the given TSN. Like a proxy for a device, a proxy for the TSN may be implemented in hardware, software, or any suitable combination thereof.

The plurality of devices is connected to the TSN or to the proxy for the TSN. Herein, at least one device is connected to the first interface of the TSN simulator described above. The second interface of this TSN simulator is connected to the TSN or to the proxy.

On the plurality of devices, a candidate configuration with respect to the intended functionality of the DCS is implemented. For example, on one or more PLCs as devices, control logic may be implemented, such that the PLCs read input data from other devices, perform control computations according to the control logic, and output the results to other devices.

On the TSN simulator, a plurality of test configurations is implemented. These test configurations determine when and how the TSN simulator is to modify and/or delay network traffic. Each such test configuration corresponds to an abnormal operating state of the TSN that is to be expected in the TSN of the industrial plant.

For each test configuration, it is determined whether the arrangement of the plurality of devices performs the intended functionality of the DCS despite the abnormal operating state caused by the test configuration. If this determination is positive for all test configurations, the candidate configuration of the DCS is determined to be fit for deployment in the industrial plant.

A configuration of the DCS that has been determined in this manner is "hardened" at least against the abnormal operating states of the TSN that are represented by the test configurations. Failure of the candidate configuration to function properly given a certain test configuration on the TSN simulator gives guidance as to what may be done to further "harden" the configuration of the DCS. For example, if the test configuration corresponds to a congestion of a particular segment of the TSN, the control strategy on at least one PLC may be updated such that it depends on a reliable communication over this particular segment to a lesser degree. This may, for example, comprise obtaining and using additional sensor data from sensors that can be reached without using the congested network segment. In case the transmission of sensor data from a primary sensor through the congested network segment is delayed, the additional sensor data may be used as a short-term replacement.

Advantageously, the DCS is deployed in the TSN as per the candidate configuration that has been determined fit for deployment. As discussed before, this increases the probability that the DCS will sufficiently perform its intended functionality even if the TSN is not behaving ideally.

The possibility to test DCS configurations before deployment using the TSN simulator facilitates the deployment of DCS configurations even without physical travel to the industrial plant where the DCS is to be deployed. After successful advance testing, the customer may be given a detailed "recipe" of the finished DCS configuration that he can deploy himself or have deployed by a local contractor. This saves time and costs for travelling to the site of the industrial plant and is particularly useful in a pandemic situation where most international business trips require a mandatory quarantine or are prohibited altogether.

As discussed before, the TSN simulator, the PLC and the methods may be wholly or partially implemented in software. The invention therefore also relates to one or more computer programs that, when executed by one or more computers and/or virtualized execution environments, cause the one or more computers and/or virtualized environments to function as the TSN simulator and/or as the PLC described above, and/or to perform one of the methods described above.

For example, the virtualized execution environment may be configured to run software containers in which an application may deployed in a self-contained manner.

The invention also provides one or more non-transitory storage media and/or download products with the one or more computer programs. A download product is a product that may be sold in an online shop for immediate fulfillment by download. The invention also provides one or more computers and/or virtualized execution environments with the one or more computer programs, and/or with the one or more non-transitory machine-readable storage media and/or download products.

All references, including publications, patent applications, and patents, cited herein are hereby incorporated by reference to the same extent as if each reference were individually and specifically indicated to be incorporated by reference and were set forth in its entirety herein.

The use of the terms "a" and "an" and "the" and "at least one" and similar referents in the context of describing the invention (especially in the context of the following claims) are to be construed to cover both the singular and the plural, unless otherwise indicated herein or clearly contradicted by context. The use of the term "at least one" followed by a list of one or more items (for example, "at least one of A and B") is to be construed to mean one item selected from the listed items (A or B) or any combination of two or more of the listed items (A and B), unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

LIST OF REFERENCE SIGNS 1 first device
2 second device
3 time sensitive network, TSN, simulator
31 first interface of TSN simulator 3
31a clock of first interface 31
32 second interface of TSN simulator 3
32a clock of second interface 32
33 network traffic between interfaces 31 and 32
34 simulation unit of TSN simulator 3
34a, 34b TSN switches/bridges in simulation unit 34
35 candidate configuration on TSN simulator 3
36 test configuration on TSN simulator 3
4 programmable logic controller, PLC
41 input data for PLC 4
42 actuation signal from PLC 4
43 control logic of PLC 4
5 time sensitive network, TSN
51-53 devices in TSN 5

100 method for troubleshooting abnormal operational state A
110 providing TSN simulator 3
120 connecting first device 1 to first interface 31
130 connecting second device 2 to second interface 32
140 implementing candidate configuration 35 on TSN simulator 3
150 testing whether candidate configuration 35 causes abnormal state A
160 determining candidate root cause r to be likely root cause R
200 method for deploying distributed control system, DCS
210 providing given TSN
220 connecting devices 51, 52, 53 to TSN 5 or proxy
230 implementing candidate configuration c on devices 51, 52, 53
240 implementing test configurations 36
250 testing whether intended functionality performs correctly
260 determining that configuration c is fit configuration C for deployment
270 deploying fit configuration C
c candidate configuration for DCS
r candidate root cause for abnormal state A
A abnormal state in cooperation of devices 1 and 2
R likely root cause for abnormal state A.

What is claimed is:

1. A time sensitive network (TSN) simulator for connecting a first device of a distributed control system (DCS) for an industrial plant to at least one second device of the DCS that is configured as a TSN client, comprising:
a first interface that is connectable to the first device;
a second interface that is connectable to the second device, and/or to a TSN to which the second device is attached; and
a simulation unit implemented as an application-specific integrated circuit (ASIC) that mimics a TSN and comprises a plurality of TSN switches and/or bridges, wherein the simulation unit is configured to:
forward network traffic between the first interface and the second interface, and
modify and/or delay network traffic during this forwarding, thereby simulating a behavior of a real, non-perfect TSN that provides communication between the first device and the second device,
wherein the non-perfect behavior includes a deviation from a specification of the TSN.

2. The TSN simulator of claim 1, wherein the simulation unit is further configured to modify and/or delay network traffic by, at least one of:
holding back at least one original message received on the first or second interface for a predetermined and/or randomized time, and then forwarding this original message to the first or second interface, respectively;
augmenting a stream of original messages received on the first or second interface with further messages, and delivering a mixture of the original messages and the further messages to the first or second interface, respectively;
suppressing, from a stream of original messages received on the first or second interface, a subset of the messages, and delivering a stream of the original messages minus the suppressed messages to the first or second interface, respectively; and/or
modifying individual messages in a stream of original messages received on the first or second interface, and delivering, to the first or second interface, respectively, a stream of messages in which modified messages take the places of original messages.

3. The TSN simulator of claim 2, wherein the simulation unit is configured to modify at least one individual message by garbling the at least one individual message with a noise sample, so as to mimic a noisy physical transmission.

4. The TSN simulator of claim 2, wherein the simulation unit is configured to modify at least one individual message by rewriting and/or recasting the message such that it violates TSN or any other communication standard in use on a path between the first device and the second device, so as to mimic a faulty implementation of the respective communication standard.

5. The TSN simulator of claim 2, wherein the simulation unit is further configured to hold back the at least one original message in deliberate contradiction to a TSN priority class, and/or of a TSN preemption split, that applies to this original message, and/or to another original message, so as to mimic a faulty implementation of the TSN priority and/or preemption handling.

6. The TSN simulator of claim 1, wherein the simulation unit comprises representations of at least two TSN bridges and/or switches and is further configured to:
feed at least one message from the first interface to a chosen port of one of the TSN bridges and/or switches;
process the message by the TSN bridges and/or switches; and
feed the outcome from another chosen port of one of the TSN bridges and/or switches to the second interface.

7. The TSN simulator of claim 1, wherein the first interface and the second interface comprise distinct system clocks that are configured to run offset against each other in time, and/or to run at different speeds.

8. The TSN simulator of claim 1, wherein the simulation unit is further configured to modify and/or delay network traffic at random, and/or in response to a stream of original messages received on the first and/or second interface that meets at least one predetermined rule.

9. The TSN simulator of claim 8, wherein at least one rule causes at least one message to be modified and/or delayed in response to at least one of:
the message originating from, or being destined to, a particular network address;
the message originating from, or being destined to, a device of a particular type;
the message originating from, or being destined to, a device from a particular vendor; and/or
a payload of the message fulfilling a predetermined condition.

10. The TSN simulator of claim 1, wherein at least the second interface is configured to communicate with the second device according to the Open Platform Communication Unified Access (OPC UA) standard.

* * * * *